United States Patent [19]
Chatterjee et al.

[11] Patent Number: 5,234,201
[45] Date of Patent: Aug. 10, 1993

[54] CONTOUR HARDENING APPARATUS

[75] Inventors: Madhu S. Chatterjee, Carmel, Ind.; William I. Stuehr, North Royalton, Ohio

[73] Assignee: General Motors Corporation, Detroit, Mich.

[21] Appl. No.: 906,185

[22] Filed: Jun. 29, 1992

[51] Int. Cl.$^5$ ............................................. C21D 1/10
[52] U.S. Cl. ..................................... 266/129; 266/125
[58] Field of Search ............... 266/129, 128, 125, 126, 266/114; 219/10.59, 10.43

[56] References Cited

U.S. PATENT DOCUMENTS

| | | | |
|---|---|---|---|
| 2,339,157 | 1/1944 | Denneen et al. | 219/13 |
| 4,251,704 | 2/1981 | Masie et al. | 266/129 |
| 4,675,488 | 6/1987 | Mucha et al. | 219/10.43 |
| 4,757,170 | 7/1988 | Mucha et al. | 219/10.43 |
| 4,785,147 | 11/1988 | Mucha et al. | 219/10.59 |
| 4,808,779 | 2/1989 | Cogley | 219/10.43 |
| 4,855,551 | 8/1989 | Mucha et al. | 219/10.43 |
| 4,855,556 | 8/1989 | Mucha et al. | 219/105.9 |
| 4,894,501 | 1/1990 | Pfaffmann et al. | 219/10.43 |

*Primary Examiner*—Scott Kastler
*Attorney, Agent, or Firm*—Saul Schwartz

[57] ABSTRACT

A contour hardening apparatus for flat steel work pieces, such as gears, having convoluted surfaces around their circumferences, the apparatus including an annular inductor housing, a mandrel in the center of the inductor housing, and air bearing rotatably mounting the work piece on the mandrel, an air nozzle on the inductor housing aimed at the convoluted surfaces and operative in an ON condition to direct a jet of compressed air against the convoluted surfaces to develop on the work piece a first turning moment in a first direction to rotate the work piece in the first direction during heating, an oil manifold on the inductor housing supplied with oil under pressure and including a first plurality of oil nozzles in the plane of the work piece each oriented to direct a jet of oil at the convoluted surfaces to develop on the work piece a second turning moment opposite the first turning moment, and means to supply the oil manifold with oil under pressure when the air nozzle is in an OFF condition. The jets of oil from the first plurality of nozzles stop the rotation of the work piece at the onset of oil quench.

3 Claims, 3 Drawing Sheets

CONTOUR HARDENING APPARATUS

This invention was made in the course of work under a contract or subcontract with the U.S. Department of Defense.

FIELD OF THE INVENTION

This invention relates to contour hardening apparatus for work pieces such as steel gears.

BACKGROUND OF THE INVENTION

Heat treating processes by which only the surfaces of gear teeth and the surfaces of the roots between the gear teeth are hardened to improve wear resistance are commonly called contour hardening processes. Typical contour hardening apparatuses include an induction coil around the gear for heating the gear in carefully controlled cycles and an electric motor for rotating the gear to assure uniformity of heating. Such apparatuses also include either a standing pool of liquid quench medium or polymer quench (referred to herein as "oil") into which the gear is lowered after the heating cycle or an oil manifold in the inductor coil housing from which oil floods the gear after the heating cycle. Either way, a mechanical brake is provided to stop the gear from rotating during quench to prevent centrifuging of oil off of the gear and consequent hardness variations. A contour hardening apparatus according to this invention is a novel alternative to such prior contour hardening apparatuses.

SUMMARY OF THE INVENTION

This invention is a new and improved contour hardening apparatus for a flat circular steel work piece, such as a gear, having a plurality of radially projecting convoluted surfaces. The apparatus according to this invention includes an annular inductor housing, a mandrel for supporting the work piece in the center of the annular housing, and an air bearing between the work piece and the mandrel which supports the work piece for rotation relative to the inductor housing about a vertical axis perpendicular to the plane of the work piece. An air nozzle on the inductor housing is selectively connected to a source of compressed air and is aimed at the convoluted surfaces on the work piece. In an ON condition of the air nozzle, an air jet impinges on the convoluted surfaces to develop on the work piece a first turning moment for rotating the work piece about the vertical axis during induction heating. An oil manifold in the inductor housing is connected to a source of pressurized oil when the air nozzle is in an OFF condition and includes a first, a second, and a third plurality of oil nozzles aimed at the work piece. Each oil nozzle in the first plurality of nozzles is disposed in a plane perpendicular to the vertical axis and aimed at the convoluted surfaces of the work piece such that oil issuing from the first plurality of nozzles impinges against the convoluted surfaces to develop on the work piece a second turning moment opposite the first turning moment to stop rotation of the work piece at the onset of quench. The second and third pluralities of nozzle are above and below the first plurality of nozzles and are aimed toward the convoluted surfaces of the work piece such that the latter is concurrently flooded from above and below.

DESCRIPTION OF A PREFERRED EMBODIMENT

Figure 1:
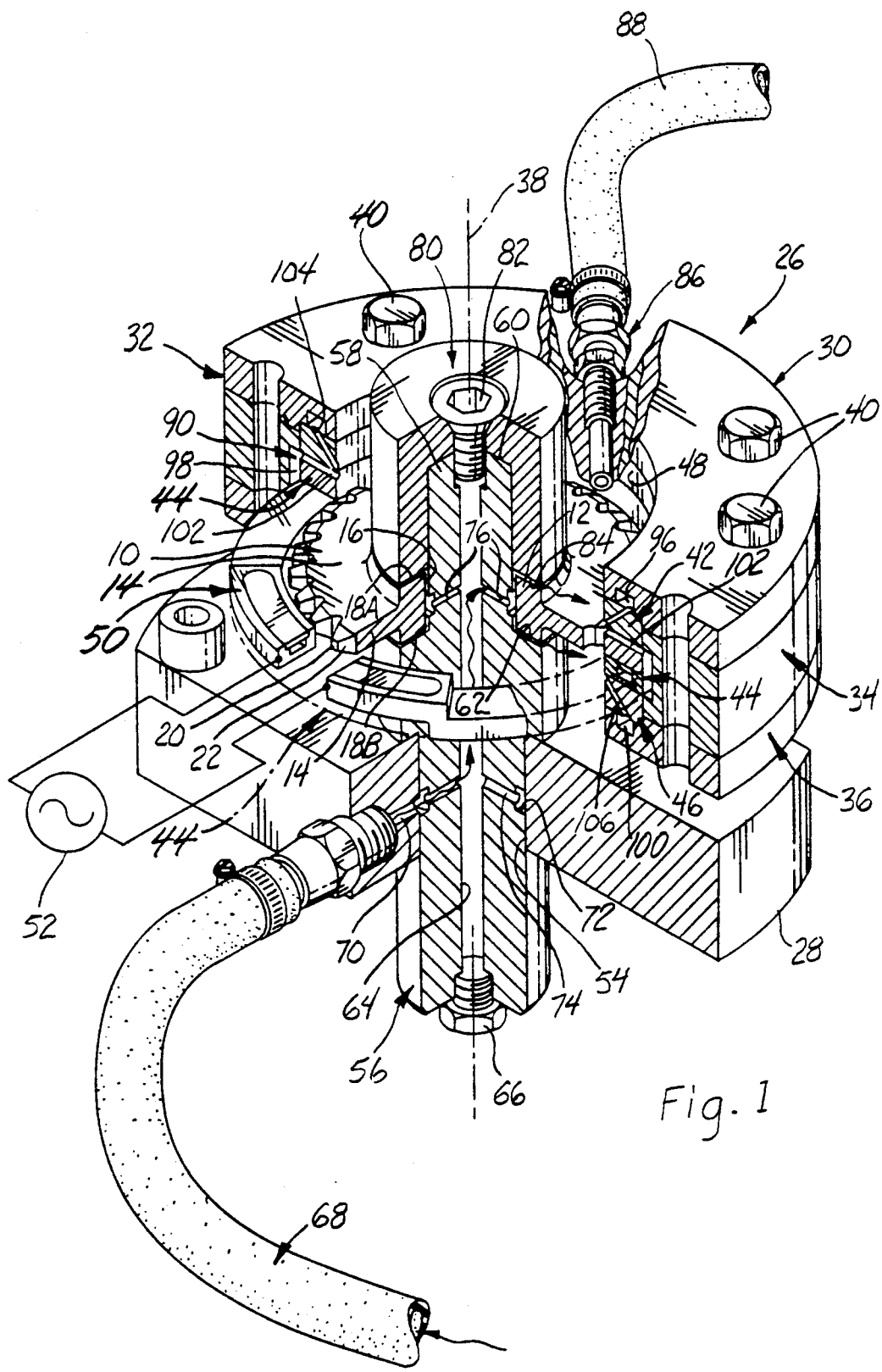
FIG. 1 is a fragmentary, broken-away perspective view of a contour hardening apparatus according to this invention.
Figure 2:
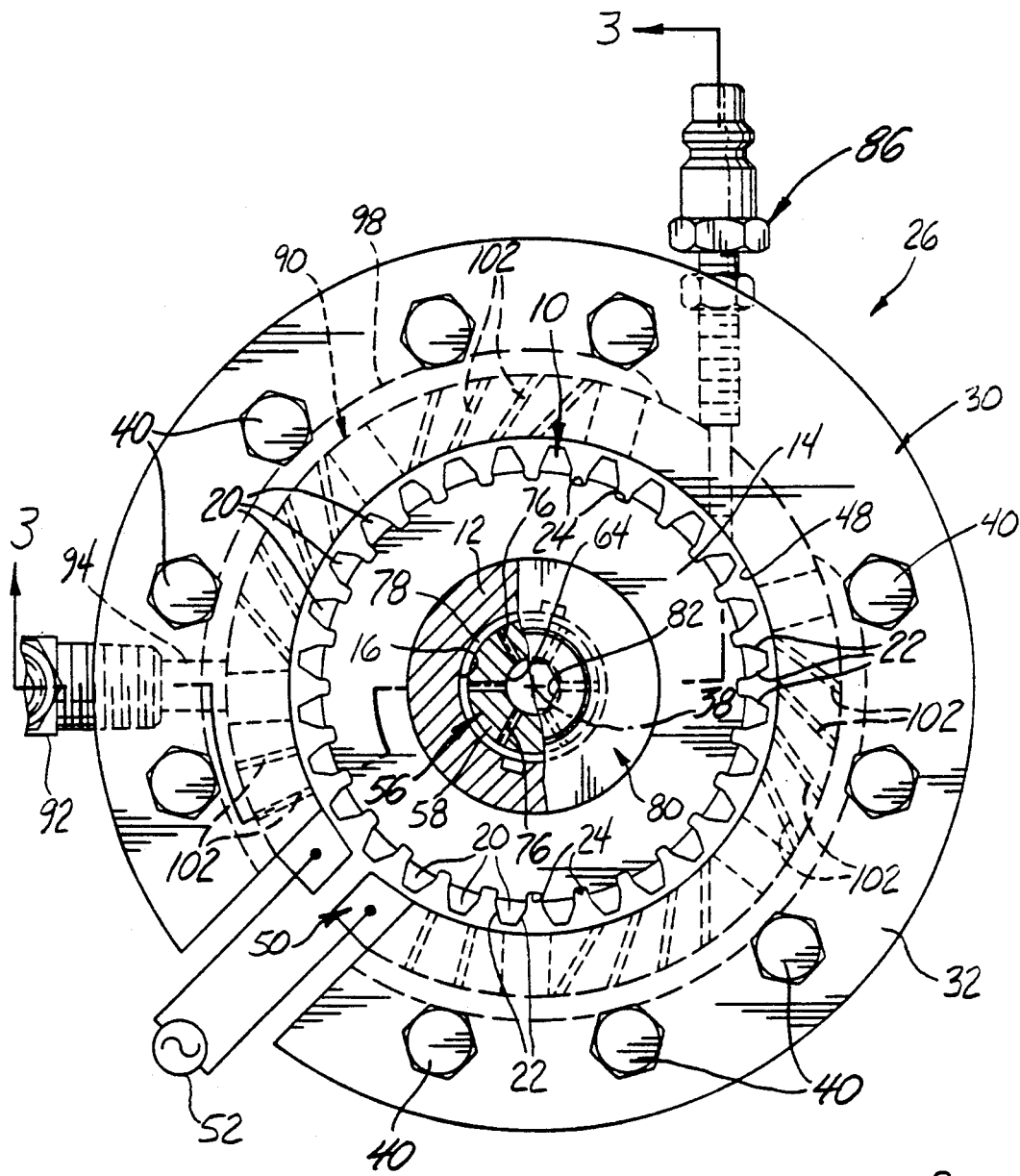
FIG. 2 is a partially broken-away plane view of the contour hardening apparatus according to this invention.
Figure 3:
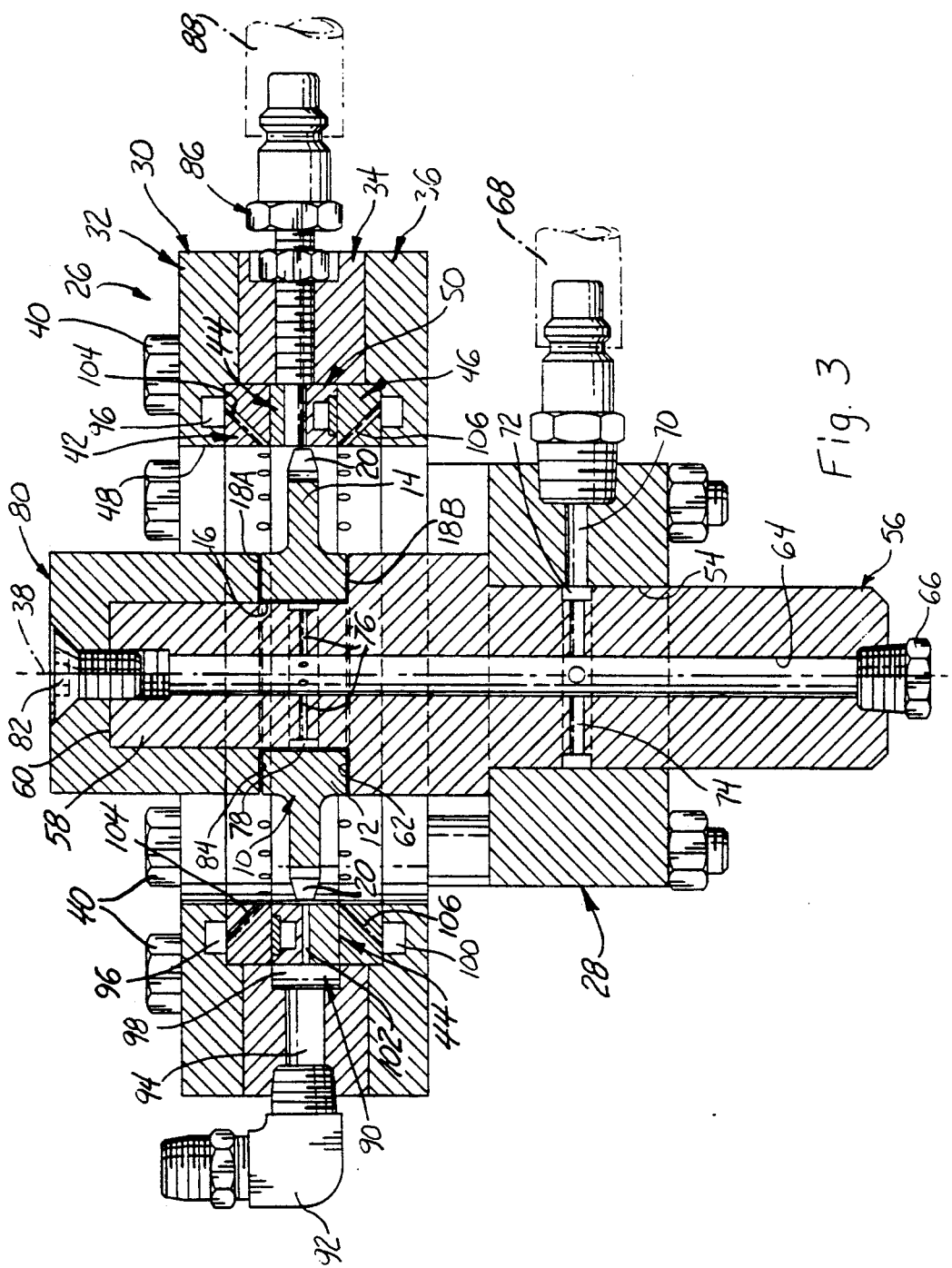
FIG. 3 is a sectional view taken generally along the plane indicated by lines 3—3 in FIG. 2.

Referring to FIGS. 1-3, a representative work piece suitable for contour hardening is illustrated in the Figures as a steel gear (10). The gear (10) includes a cylindrical hub (12) and an integral planar disc portion (14) around the hub. The hub (12) has a bore (16) therethrough and a pair of annular end surfaces (18A-B) at opposite ends of the hub. The disc portion (14) has a radially projecting convoluted surface around its circumference defined by a plurality of gear teeth (20). The gear teeth include a plurality of side surfaces (22) and a plurality of root surfaces (24), FIG. 2. The gear (10) is contour hardened by a contour hardening apparatus (26) according to this invention.

The apparatus (26) according to this invention includes a fragmentarily illustrated stationary base (28) and an annular inductor housing (30) rigidly mounted on the base. The housing (30) is a sandwich of a plurality of annular plastic plates including an upper plate (32), a center plate (34), and a lower plate (36) all disposed in planes perpendicular to a vertical axis (38) of the apparatus and held together by a plurality of bolts (40). The inductor housing supports an upper intensifier ring (42), an interrupted or segmented middle intensifier ring (44), and a lower intensifier ring (46) such that an inner edge of each ring is disposed in a cylindrical inner wall (48) of the housing.

A copper inductor coil (50) is supported generally on the middle intensifier ring (44) and is connected to a schematically represented solid state power supply (52), FIGS. 1-2. The power supply may be a 50-200 KHz, 500 KW unit for contour hardening as described in U.S. Pat. No. 4,639,279, issued Jan. 27, 1987 and assigned to the assignee of this invention. In conventional fashion, the intensifier rings (42-46) concentrate the electromagnetic flux field generated by the coil (50) when the coil is energized by the power supply (52).

The base (28) has a bore (54) therein aligned on the vertical axis (38). A mandrel (56) is disposed in the bore (54) and rigidly connected to the base. The mandrel (56) has a cylindrical pilot (58) centered on the vertical axis (38) extending down from an upper end (60) of the mandrel to an annular shoulder (62) in a plane perpendicular to the vertical axis. The diameter of the pilot (58) corresponds to the diameter of the bore (16) in the gear (10). A center bore (64) through the mandrel is closed at a lower end by a threaded plug (66).

In a mounted position of the gear (10) on the contour hardening apparatus (26), FIGS. 1-3, the bore (16) in the gear is closely received on the pilot (58) with the annular surface (18B) on the hub (12) facing the annular shoulder (62) on the mandrel. In that position, the gear teeth (20) are concentric with and closely adjacent the inner wall (48) of the inductor housing. Further, clearance between the pilot (58) and the bore (16) accommodates rotation of the gear about the vertical axis (38) as well as small excursions in the direction of the vertical axis.

The bore (64) in the mandrel (56) defines a compressed air gallery supplied with compressed air through a hose assembly (68) connected to a compressor, not shown, and to the base (28). The hose assembly communicates with the bore (64) through a passage (70) in the base, an annular groove (72) in the mandrel, and a plurality of radial passages (74) in the mandrel. The compressed air gallery communicates with the pilot (58) through a plurality of radial passages (76) and an annular groove (78) in the pilot located within the bore (16) of the gear (10) in the mounted position of the gear on the apparatus (26).

A cup-shaped retainer (80) fits over the upper end (60) of the mandrel (56) and is held on by a screw (82) which also closes the upper end of the compressed air gallery. The lower edge of the retainer (80) defines an annular shoulder (84) in a plane perpendicular to the vertical axis (38). The shoulder (84) is separated from the shoulder (62) on the mandrel (56) by a distance corresponding to the length of the hub (12) on the gear (10). With the gear (10) in its mounted position on the contour hardening apparatus (26) and the compressed air gallery pressurized to about 20 psi, a film of compressed air forms an air bearing between the hub (12) of the gear and the mandrel (56) whereby the gear is supported on the apparatus (26) for relatively frictionless rotation about the vertical axis (38).

The contour hardening apparatus (26) further includes an air nozzle (86) on the inductor housing (30) in the plane of the disc portion (14) of the gear (10). A valve, not shown, opens and closes a hose (88), FIG. 1, extending between the nozzle (86) and a compressor, not shown. The open and closed conditions of the hose correspond to an ON condition and an OFF condition, respectively, of the air nozzle (86). In the ON condition of the nozzle, a jet of compressed air issues from the nozzle and impinges on the sides (22) of the gear teeth (20) such that a first turning moment develops on the gear (10) operative to rotate the gear clockwise, FIGS. 1-2, about the vertical axis (38). The speed of rotation of the gear is controlled by regulating nozzle air pressure in the ON condition of the nozzle.

An oil manifold (90) is formed in the inductor housing (30) and connected to a source, not shown, of oil at a pressure of about 65 psi through a pipe fitting (92) on the center plate (34) of the inductor housing and a radial passage (94) in the center plate. A valve, not shown, between the oil source and the pipe fitting (92) opens and closes in opposite synchronization with the valve controlling airflow to the air nozzle (86) so that the oil manifold is pressurized in the OFF condition of the air nozzle and unpressurized in the ON condition of the air nozzle.

The manifold (90) includes an upper chamber (96), a circular middle chamber (98), and a circular lower chamber (100). A first plurality of oil nozzles (102) of the manifold (90) is defined by passages in the middle intensifier ring (44). Each of the nozzles in the first plurality thereof communicates with the middle chamber (98) and is disposed in the plane of the disc portion (14) of the gear (10). Substantially all of the first plurality of nozzles are aimed at the gear teeth (20) to impinge on the sides (22) thereof opposite the impingement of the air nozzle (86). Accordingly, oil issuing from the first plurality of nozzles (102) develops on the gear (10) a second turning moment in a counter-clockwise direction, FIGS. 1-2, opposite the aforesaid first turning moment developed by the air nozzle.

A second plurality of oil nozzles (104) of the manifold (90) is defined by passages in the upper intensifier ring (42) and a third plurality of oil nozzles (106) of the manifold (90) is defined by passages in the lower intensifier ring (46). Each of the nozzles in the second plurality thereof communicates with the upper chamber (96) and each of the nozzles in the third plurality thereof communicates with the lower chamber (100). Each of the nozzles in the second and third pluralities (104,106) is aimed generally toward the vertical axis (38) but at an angle relative to the plane of the disc portion (14) of the gear (10). Accordingly, when the oil manifold is pressurized, the gear teeth (20) are flooded from above and below from the second and third pluralities of nozzles (104,106), respectively.

In operation, the gear teeth (20) are heated by the inductor coil (50) as described in the aforesaid U.S. Pat. No. 4,639,279. During heating, the air nozzle is in its ON condition and the gallery in the mandrel (56) is connected to the compressor. Concurrently, the oil manifold (90) is unpressurized so that no oil issues from any of the first, second or third plurality of oil nozzles (102-106). In that circumstance, the air bearing defined between the gear (10) and the mandrel (56) levitates the gear on the mandrel so that the air jet issuing from the air nozzle (86) easily rotates the gear within the confines of the inductor housing for uniform heating.

At completion of the heating cycle, the air nozzle is transitioned to its OFF condition and the oil manifold is transitioned to its pressurized condition. Jets of oil issue concurrently from the first, second and third plurality of oil nozzles (102-106). The oil issuing from the first plurality of nozzles (102) and impinges against the sides (22) of the gear teeth (20) to develop the aforesaid second turning moment on the gear opposite the first turning moment. Because the air nozzle (86) is in its OFF condition, the second turning moment has the effect of instantly stopping the rotation of the gear. Concurrently, copious quantities of oil flood the gear teeth (20) from above and below from the second and the third plurality of oil nozzles (104,106) to quench the sides and roots of the gear teeth.

Rotation of the gear by the air nozzle (86) and the stopping of gear rotation by the first plurality of oil nozzles (102) are important features of this invention. Air jet induced rotation of the gear eliminates the electric motor used in prior apparatuses. Use of the oil nozzles to stop rotation of the gear eliminates the mechanical braking apparatus of earlier contour hardening apparatuses.

The embodiments of the invention in which an exclusive property or privilege is claimed are defined as follows:

1. A contour hardening apparatus for hardening a plurality of radially projecting convoluted surfaces around the circumference of a generally planar circular steel work piece,
   said contour hardening apparatus comprising:
   a base defining a vertical axis of said contour hardening apparatus,
   an annular inductor housing rigidly connected to said base having a cylindrical inner wall disposed symmetrically about said vertical axis,
   a mandrel rigidly connected to said base and aligned on said vertical axis within said inner cylindrical wall of said inductor housing, bearing means mounting said work piece on said mandrel within said inner cylindrical wall of said inductor housing for rotation about said vertical axis, an air nozzle means on said inductor housing having an ON condition in which an air jet is directed by said air nozzle means at said convoluted surfaces of said work piece to develop on said work piece a first turning moment in a first direction operative to rotate said work piece about said vertical axis in said first direction and an OFF condition in which said air jet is off, means on said inductor housing defining an oil manifold including a first plurality of oil nozzles each disposed in the plane of said work piece and oriented to direct a jet of oil against said convoluted surfaces of said work piece when said manifold is supplied with oil under pressure to develop on said work piece a second turning moment in a second direction opposite said first direction, and means operative to supply oil under pressure to said oil manifold in said OFF condition of said air nozzle so that said second turning moment stops rotation of said work piece relative to said inductor housing.

2. The contour hardening apparatus recited in claim 1 wherein said bearing means mounting said work piece on said mandrel within said inner cylindrical wall of said inductor housing for rotation about said vertical axis includes:

means defining an air bearing between said mandrel and said work piece.

3. The contour hardening apparatus recited in claim 2 wherein said oil manifold further includes:

means defining a second plurality of oil nozzles in said inductor housing above the plane of said work piece and aimed at said convoluted surfaces on said work piece to flood said convoluted surfaces from above when said oil manifold is supplied with oil under pressure, and means defining a third plurality of oil nozzles in said inductor housing below the plane of said work piece and aimed at said convoluted surfaces on said work piece to flood said convoluted surfaces from below when said oil manifold is supplied with oil under pressure.

* * * * *